(12) United States Patent
Glacer et al.

(10) Patent No.: US 12,730,064 B2
(45) Date of Patent: Sep. 8, 2026

(54) PACKAGE FOR AN OPTICAL RADIATION DEVICE

(71) Applicant: Infineon Technologies AG, Neubiberg (DE)

(72) Inventors: Christoph Glacer, Munich (DE); Ulrich Krumbein, Rosenheim (DE); Tobias Mittereder, Munich (DE); Mark Pavier, East Grinstead (GB); Siyuan Qi, Crawley (GB); Hugh Richard, Gravesend (GB); David Tumpold, Kirchheim b München (DE); Paul Westmarland, Surrey (GB)

(73) Assignee: Infineon Technologies AG, Neubiberg (DE)

( * ) Notice: Subject to any disclaimer, the term of this patent is extended or adjusted under 35 U.S.C. 154(b) by 253 days.

(21) Appl. No.: 18/582,173

(22) Filed: Feb. 20, 2024

(65) Prior Publication Data

US 2024/0288363 A1 Aug. 29, 2024

(30) Foreign Application Priority Data

Feb. 23, 2023 (EP) .................................... 23158197

(51) Int. Cl.
*G01N 21/3504* (2014.01)

(52) U.S. Cl.
CPC ................................ *G01N 21/3504* (2013.01)

(58) Field of Classification Search
None
See application file for complete search history.

(56) References Cited

U.S. PATENT DOCUMENTS

| | | | | |
|---|---|---|---|---|
| 2005/0017206 | A1* | 1/2005 | Tice | G01N 15/06 250/573 |
| 2021/0137430 | A1* | 5/2021 | Haase | A61B 5/1451 |
| 2021/0172862 | A1 | 6/2021 | Qi et al. | |
| 2022/0187193 | A1* | 6/2022 | Uehlinger | G01N 21/3504 |
| 2022/0299639 | A1* | 9/2022 | Liao | H04B 10/07 |
| 2023/0036932 | A1 | 2/2023 | Rudmann et al. | |

FOREIGN PATENT DOCUMENTS

| | | |
|---|---|---|
| EP | 3984945 A1 | 4/2022 |

* cited by examiner

*Primary Examiner* — Edwin C Gunberg
(74) *Attorney, Agent, or Firm* — Slater Matsil, LLP

(57) ABSTRACT

A package for an optical radiation device comprises a base structure having arranged thereon an optical radiation device, an optically transparent lid element bonded to the base structure defining a cavity between the base structure and the lid element, and a bond structure in a bonding region between the base structure and the lid element, wherein the bond structure is arranged to provide an adhesive bond between the base structure and the lid element, and wherein the bond structure comprises a diffusion layer having a gas diffusive material or gas diffusive structure for providing a gas diffusion path between the cavity and the surrounding atmosphere.

20 Claims, 14 Drawing Sheets

100
14
20-2
20-1
20
13
28
adhesive
x
z
y
24
12
optical filter (optional)
16
cavity package
10

14
25
"filter adhesive"
20
(20-2)
13
diffusion path
20
24
z
x
y
14
optical filter (optional)
16
cavity package
10
20
(20-2)
13
11
12
X
20
13
100

PACKAGE FOR AN OPTICAL RADIATION DEVICE

This application claims priority from European Application No. 23158197, filed on Feb. 23, 2023, which application is hereby incorporated herein by reference.

TECHNICAL FIELD

Embodiments relate to a package for an optical radiation device, e.g. for an optical radiation source (emitter) or an optical radiation detector. More specifically, embodiments relate a package for an optical radiation device having a high gas diffusivity interface.

BACKGROUND

The sensing of environmental parameters in the ambient atmosphere, such as noise, sound, temperature and gases, e.g. environmental gas components, gains more and more importance in the implementation of appropriate sensors within mobile devices, home automation, such as smart home, the automotive sector, etc. With the evermore extensive use of sensors, there is also a particular need to be able to provide such sensors, e.g. for sensing the environmental air quality, and their components as inexpensively as possible, while the achieved reliability and accuracy of the sensors should be as high as possible.

In the field of monitoring the air quality in our environment, there are several types of existing gas sensing techniques, for example, NDIR sensors (NDIR=non-dispersive infrared), chemical sensors, catalytic bead (pellistor) sensors and photo-acoustical sensors (PAS sensors, PAS=photoacoustic spectroscopy). One typical sensor technique is based on the excitation of gas molecules in a medium by (e.g. infrared) light with a certain wavelength. However, NDIR or PAS systems can be relatively expensive due to their complex set-ups or special components even if the NDIR or PAS devices offer a relatively high sensitivity together with a relatively cheap set of components. Furthermore, chemical sensors can exhibit a relatively poor selectivity compared to single-wavelength or filter containing optical systems.

A typical optical sensor, e.g. a PAS or NDIR sensor, comprises a radiation source, filter elements for a wavelength selection, a detector and the sample area (interaction area) where the light between the light source and the detector interacts with the environmental medium.

Depending on the target gas (the gas to be measured), e.g. CO2, a parasitic content of this gas (or of another gas) inside the emitter (PAS) package or the detector (NDIR) package would affect the sensitivity of such a sensor toward the target gas. The presence of a parasitic gas, such as CO2, e.g. in the emitter or detector, forms relatively easy due to temperature steps, such as bake and reflow process steps, applied to the gas sensor system during the manufacturing process.

SUMMARY

According to an embodiment, a package for an optical radiation device comprises a base structure having arranged thereon the optical radiation device, an optically (IR, UV or visible radiation) transparent lid element bonded to the base structure defining a cavity between the base structure and the lid element, and a bond structure in a bonding region between the base structure and the lid element. The bond structure is arranged to provide an adhesive bond between the base structure and the lid element, and the bond structure comprises a diffusion layer having a gas diffusive material or gas diffusive structure for providing a gas diffusion path between the closed cavity and the surrounding atmosphere. According to an embodiment, the optical radiation device is an optical radiation emitter or an optical radiation detector.

Thus, different embodiments can be used in physical gas sensors, such as in photoacoustic spectroscopy (PAS) and non-dispersive infrared (NDIR) gas sensors, such as the emitter (for a PAS sensor) or the detector (for the NDIR sensor).

Thus, the present disclosure describes a design of a package that has a defined diffusion path to allow an out-diffusion of gases inside an emitter (for a PAS sensor) or a detector (for an NDIR sensor). A defined exchange with the ambient air can be used to further dilute the gas inside the emitter/detector package. Thus, a reduced amount of a gas remains in the package of the optical radiation device.

According to embodiments, the package may comprises an acoustically tight gas diffusion path, e.g. with an acoustically tight bond structure. Thus, the package may be acoustically sealed in some embodiments. Further, the bond structure may comprise a diffusion layer having a "parasitic" gas diffusive material or parasitic gas diffusive structure for providing an acoustically tight parasitic gas diffusion path between the cavity and the surrounding atmosphere. Any gas which negatively influences or affects the operation of the optical radiation device may be regarded as a parasitic gas, i.e. a gas or gas composition, which has a negative effect to the functionality of the optical radiation structure.

An acoustically tight package may provide the cavity being acoustically isolated from the sample area (interaction area) in the measurement cell of a sensor device. Moreover, acoustical influences or interferences from the environment, e.g. in the frequency range of the periodically chopped radiation emitted from the (PAS) radiation source, may be sufficiently attenuated and suppressed, i.e. acoustically kept away from the cavity of the package.

Once the gas (or parasitic gas) is fully driven out and/or at the same level (equilibrium) with the ambient gas concentration (or ambient parasitic gas concentration), the device can be calibrated. A further increase of gas, e.g. due to operation, may be avoided due to the constantly given diffusivity of the package.

According to embodiments, the package for an optical radiation device uses a highly gas permeable layer (diffusion layer) in the interface (having a high gas diffusivity) of a cavity package which is typically closed by an optical filter (lid element). This diffusion layer can be integrated in front-end or back-end on the filter or on the cavity package directly. To seal off the package, an adhesive layer can be used. According to embodiments, filter particles can be directly integrated into the adhesive, such as to modify its diffusion properties.

Certain embodiments provide an improved package for an optical radiation device, e.g. an optical radiation source as part of a PAS sensor or an optical radiation detector as part of an NDIR sensor, for achieving improved operating characteristics of the optical radiation device and of the sensor device comprising the optical radiation device.

Thus, embodiments of the package having the high gas diffusivity interface can achieve the following technical effects.

The package can avoid that an elevated amount of the gas, e.g. a parasitic gas such as CO2, is present inside the emitter package during the sensor calibration, where an elevated amount of the gas can quickly diffuse out of the package.

Thus, a gas causing a drift of the sensor toward lower concentrations detected can be avoided in case of an emitter in a PAS system, for example. Thus, a gas (e.g. $CO_2$) inside the PAS emitter package reducing the radiation output by light absorption can be avoided. Thus, the gas sensitivity of the PAS sensor is not lowered, since reduced radiation reaching the interaction area of the sensor cell can be avoided.

Moreover, during assembling and operating the emitter, e.g. a ceramic emitter, the air pressure within the sealed cavity becoming too low due to curing of the lid adhesive (filter adhesive) at a high temperature can be avoided as the air pressure falls within the cavity on cooling.

In case, UV cured adhesive are used for the lid (filter) attachment and a contamination occurred due to uncured adhesive material in the (ceramic) cavity, interfering shifts in the (ceramic) emitter output signal can be avoided as the (parasitic) gas content, e.g. $CO_2$, which results from the contamination, can easily diffuse to the environment.

Moreover, the package can prevent an elevated amount of the (parasitic) gas, e.g. $CO_2$, being present inside the detector package during the sensor calibration, where an elevated amount of the gas can quickly diffuse out of the package. Thus, a gas causing a drift of the sensor toward higher concentrations can be prevented in a detector of a NDIR system. Thus, a gas, e.g. a parasitic gas, such as $CO_2$, inside the NDIR detector package reducing the received radiation due to light absorption can be avoided. Thus, the gas sensitivity ($CO_2$ sensitivity) is not lowered, since less radiation reaching the radiation detector can be avoided.

BRIEF DESCRIPTION OF THE DRAWINGS

In the following, embodiments of the present disclosure are described in the following in more detail while making reference to the accompanying drawings in which.

In the following description, embodiments are discussed in further detail using the figures, wherein in the figures and the specification like elements and elements having the same functionality and/or the same technical or physical effect are labeled with the same reference numbers or are identified with the same name. Thus, the description of such like or similar elements and their functionality as illustrated in different embodiments may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are illustrative and descriptive and not necessarily limiting. In the following description of embodiments, the same or similar elements having the same function use the same reference signs or the same name. Moreover, features of the different embodiments described hereinafter may be combined with each other.

It is understood that when an element is referred to as being "connected" or "coupled" to another element, it may be directly connected or coupled to the other element, or intermediate elements that may be present. Conversely, when an element is referred to as being "directly" connected to another element, "connected" or "coupled," there may be no intermediate elements. Other terms used to describe the relationship between elements should be construed in a similar fashion (e.g., "between" and "directly between", "adjacent" and "directly adjacent", and "on" and "directly on", etc.).

For facilitating the description of the different embodiments, some of the figures comprise a Cartesian coordinate system x, y, z, wherein the x-y-plane corresponds, i.e. is parallel, to a main surface region (=a reference plane=x-y-plane), wherein the direction vertically up with respect to the reference plane (x-y-plane) corresponds to the "+z" direction, and wherein the direction vertically down with respect to the reference plane (x-y-plane) corresponds to the "−z" direction. In the following description, the term "lateral" means a direction parallel to the x- and/or y-direction or a direction parallel to (or in) the x-y-plane, wherein the term "vertical" means a direction parallel to the z-direction.

Figure 1:
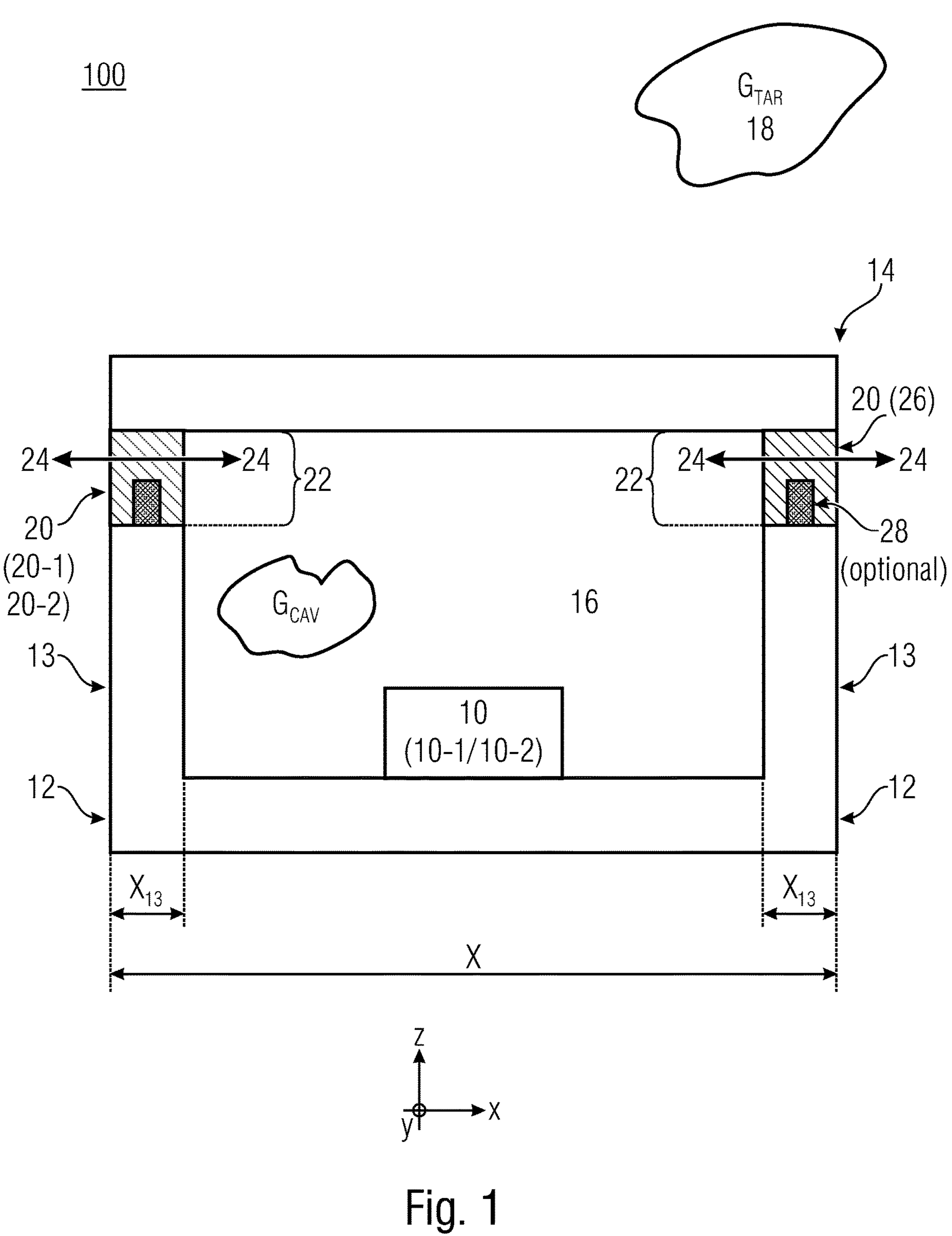
FIG. 1 shows a schematic cross-sectional view of a package for an optical radiation device according to an embodiment.

FIG. 1 shows a schematic cross-sectional view through a package 100 for an optical radiation device 10 (10-1, 10-2) according to an embodiment. As exemplarily shown in FIG. 1, the package 100 for the optical radiation device 10 comprises a base structure 12 having arranged thereon the optical radiation device 10, a lid element 14 (e.g. optically transparent for IR, UV or visible radiation) bonded to the base structure 12 and defining a cavity 16 between the base structure 12 and the lid element 14. The package 100 further comprises a bond structure 20 in a bonding region 22 between the base structure 12 and the lid element 14.

The bond structure 20 is arranged to provide an adhesive bond between the base structure 12 and the lid element 14. The bond structure 20 comprises a diffusion layer 20-1 having a gas diffusive material or gas diffusive structure for providing a gas diffusion path 24 between the closed cavity 16 and the surrounding atmosphere 18. According to an embodiment, the optical radiation device 10 may be formed as an optical radiation emitter 10-1 or an optical radiation detector 10-2.

According to an embodiment, the package 100 may comprise an acoustically tight gas diffusion path 24, e.g. with an acoustically tight bond structure 20. Thus, the package 100 may be arranged as an acoustically tight package 100. According to a further embodiment, the bond structure 20 may comprise a diffusion layer 20-1, 20-2 having a parasitic gas diffusive material or parasitic gas diffusive structure for providing an acoustically tight parasitic gas diffusion path 24 between the cavity 16 and the surrounding atmosphere 18.

In the context of the present description, the term "acoustically tight" may define a condition of the package 100 and, for example, of the bond structure 20 of the package 100, wherein a first order low frequency (roll-off corner frequency or high-pass corner frequency) is (about) 0.01 Hz (or between 0.005 and 0.05 Hz). A first order low frequency (roll-off corner frequency) of (about) 0.01 Hz (within f 10%) may result in an attenuation of 72 dB (equals a factor of 4000) at a target frequency of 40 Hz (within f 5 Hz), for example.

Figure 8A:
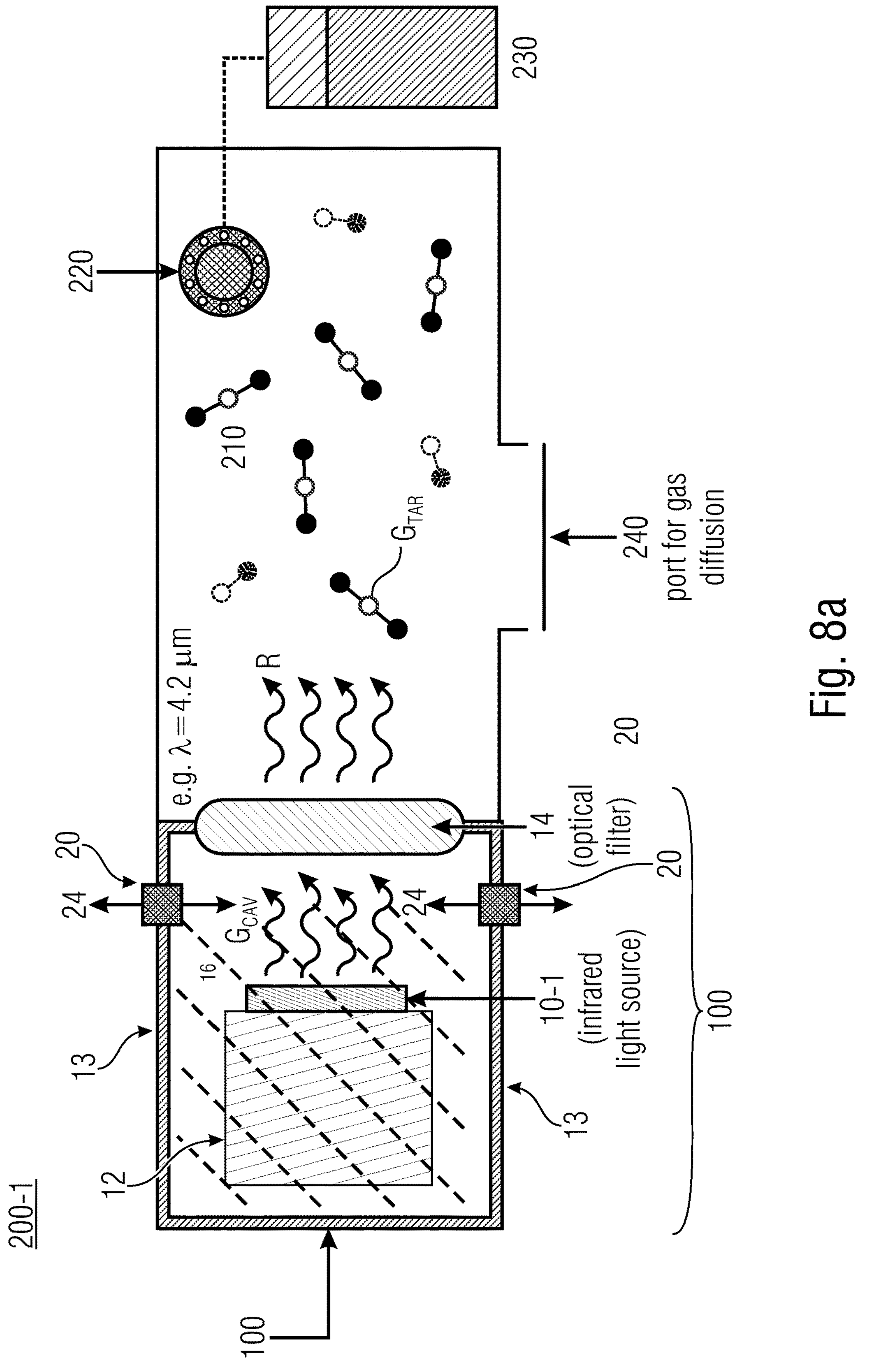
FIG. 8*a* shows a schematic block diagram of a fluid sensing device in form of a PAS gas senor having an acoustically tight package for an optical radiation device according to a further embodiment.
Figure 8B:
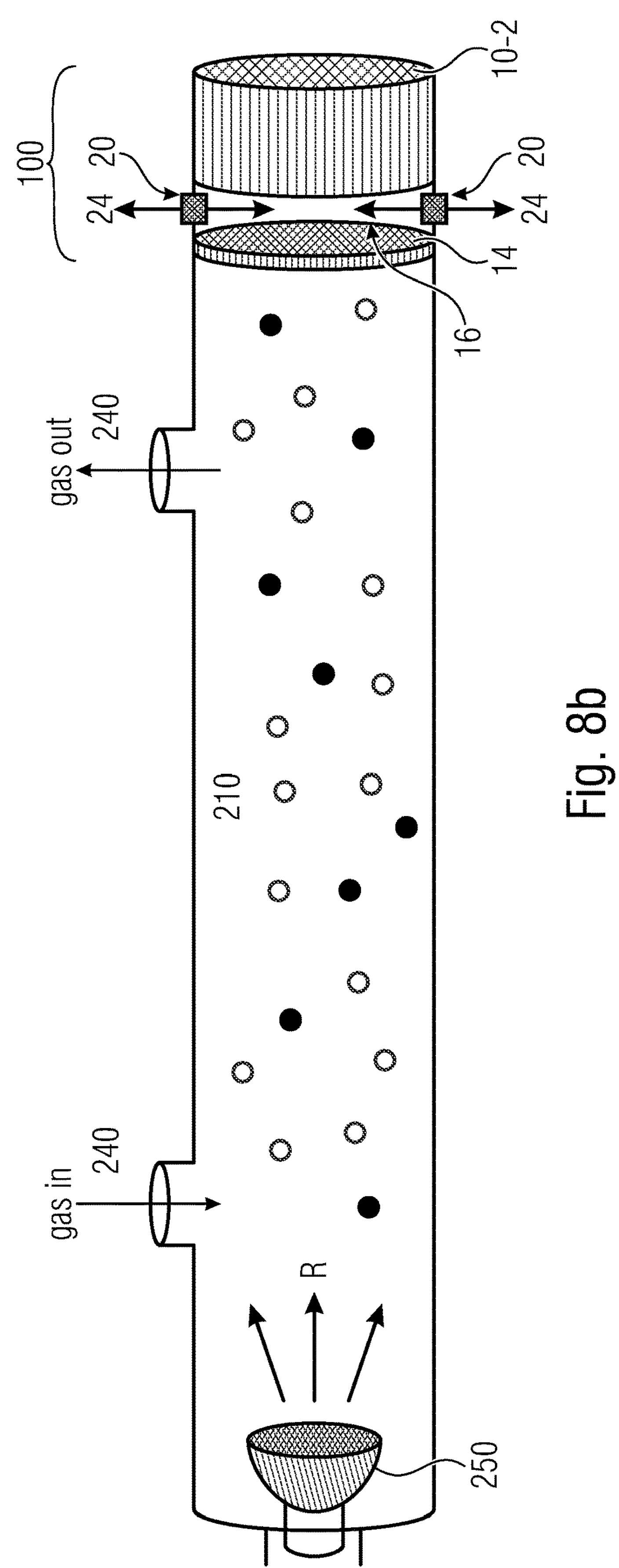
FIG. 8*b* shows a schematic block diagram of a fluid sensing device in form of a NDIR gas sensor having the package for an optical radiation device according to a further embodiment.

Thus, the acoustically tight package 100 may ensure that the cavity 16 is acoustically isolated from the sample area (interaction area) in the measurement cell of a sensor device (see FIG. 8*a-b*, for example). The periodically chopped radiation emitted from the (PAS) radiation source may be sufficiently attenuated and suppressed, i.e. acoustically kept away from the sample area (interaction area) in the measurement cell of a sensor device, such that the gas measurements can be performed to a desired accuracy.

Moreover, acoustical influences or interferences from the environment, e.g. in the frequency range of the periodically chopped radiation emitted from the (PAS) radiation source, may be sufficiently attenuated and suppressed, i.e. acoustically kept away from the cavity 16 of the package 100. Thus, the cavity 16 of the package 100 may be acoustically isolated from the environment, e.g. from external noise.

In the context of the present description, the term "parasitic" gas may relate to any gas or gas composition, which affects or (negatively) influences the operation of the optical radiation device. Thus, a parasitic gas may be any gas or gas composition, which has a negative effect to the functionality of the optical radiation structure, such as by undesirably absorbing radiation.

According to an embodiment, the optical radiation device 10 may be an IR emitter (e.g. a MEMS heater) and, thus, part of a PAS gas detector (see FIG. 8*a*, for example) for detecting a target gas GTAR, wherein the bond structure 20 is arranged to provide the diffusion path 24 for a (parasitic) gas GCAV (from or to the cavity 16) through the bond structure 20. According to a further embodiment, the optical radiation device 10 may be a laser or light emitting diode (LED), e.g. a blue ray laser with an emission wavelength of 405 nm (CWL=continuous wave laser), for example.

According to an embodiment, the optical radiation device 10 may be an optical radiation detector and part of a NDIR gas detector (e.g. a thermopile, see FIG. 8*b*, for example) for detecting a target gas GTAR, wherein the bond structure 20 is arranged to provide the diffusion path 24 for a parasitic gas GCAV through the bond structure 20.

Embodiments of the present disclosure are described with respect to gases or gas components, e.g., in the environmental air. However, the description of the different embodiments can be applicable to liquids or liquid components. Thus, the general term "fluid" may relate to a liquid or a gas or a combination of liquids and gases. Moreover, the description with respect to a gas or gas component can be applicable to a liquid or liquid component.

Thus, a target gas or target gas component is the gas or gas component to be detected or sensed and may comprise at least one of CO, CO2, O3, NOX, or methane, among others, for example. The present description may also be applicable to sense a target liquid or a target liquid component in the environmental medium. In the context of the embodiments, the target gas GTAR and the parasitic gas GCAV may relate to the same gas or gas component or may relate to different gases or different gas components. According to an exemplarily embodiment, the target gas or target gas component to be detected or sensed and the (parasitic) gas GCAV may relate to gases or gas components having similar absorption lines (which are reactive on similar bands).

To summarize, the gas (or parasitic gas) GCAV may relate to any gas content in the cavity 16 which may affect an operating parameter, e.g. the sensitivity, of the optical radiation device 10 or of a sensor device which comprises the optical radiation device 10. Thus, the gas GCAV may be the target gas to be sensed or another component, e.g. water vapor, which can also vent out through the diffusion path 24. According to an exemplarily embodiment, the target gas or target gas component GTAR to be detected or sensed may comprise CO (carbon monoxide), for example, where the (parasitic) gas GCAV may comprise CO2 (carbon dioxide), because CO and CO2 have similar absorption lines (bands). Moreover, according to a further exemplarily embodiment, the target gas or target gas component to be detected or sensed may comprise CO2 (carbon dioxide), for example, where the (parasitic) gas GCAV may comprise CO (carbon monoxide).

According to an embodiment, the bond structure 20 is arranged to have a permeability for the gas GCAV for providing a gas exchange (of gas GCAV) through the diffusion path 24 between the cavity and the surrounding environment with a diffusion time constant TD which is below 600, 300, 100 or 10 seconds or between 2 and 600, 300, 100, or 10 seconds.

The diffusion time constant TD is related to, in the context of the present description, the time duration until the gas GCAV is fully driven out of the package and/or at the same level (equilibrium) with the ambient gas concentration, such as the concentration of the gas GCAV in the environment. The diffusion time constant TD of the gas GCAV is based on the gas diffusivity or gas permeability along the diffusion path 24 through the bond structure 20. As the bond structure 20 comprises the diffusion layer having a gas diffusive material or a gas diffusive structure (for the gas GCAV), the bond structure 20 allows the transmission of the gas GCAV in both directions, i.e., both into and out of the cavity 16 (to allow a gas exchange of the gas GCAV).

In general, the term "gas permeability" or "gas diffusivity" refers to the permeability of the interface 20 to gas. The higher the gas diffusivity of the interface, for example, the better the interface can transport gas to the outside or release it back to the inside. The higher the gas diffusivity of the interface 20, the shorter is the diffusion time constant TD.

According to an embodiment, the bond structure 20 comprises the diffusion layer 20-1 and the adhesive layer 20-2 in the bonding region for providing the adhesive bond between the base structure 12 and the lid element 14. The diffusion layer 20-1 may be formed as a layer which is highly permeable for the gas GCAV, for providing the diffusion path 24 of the gas GCAV through the bond structure 20, i.e., from the cavity 16 to the surrounding environment.

The diffusion layer 20-1 may comprise a gas diffusive material or a gas diffusive structure for the gas GCAV (e.g. in form of very thin pores or capillary tubes with an effective pore size or tube diameter in a range of about 1 μm and 30 μm) for providing the diffusion path 24 between the close cavity 16 and the surrounding atmosphere. The adhesive layer 20-2 may be formed as a double-sided tape which is attached to a side (surface region) of the diffusion layer 20-1, e.g., a PTFE layer or PTFE impregnated adhesive materials, polymers, such as polyamide or cellulose acetate, or ceramic materials. The bond structure (bond line) 20 may comprise a typical overall thickness between about 30 μm and about 100 μm, for example.

The package 100 may comprise an exemplary lateral extension "X" between 2 mm and 8 mm, between 3 mm and 5 mm or of about 4 mm. The (lateral) thickness X13 of the wall 13 may be in a range of about 0.1 mm to 1 mm.

In case of a bond structure 20 comprising the diffusion layer 20-1 and the adhesive layer 20-2, the diffusion layer 20-1 may comprise a thickness t 20-1 in a range between 10 μm and 200 μm or between 30 μm and 100 μm, where the adhesive layer 20-2 may comprise a (vertical) thickness t 20-2 of about 5 μm to 100 μm. The diffusion layer 20-1 and the adhesive layer 20-2 may comprise a (lateral) width w 20-1, w 20-2 of about 0.1 mm to 2 mm which corresponds to the (lateral) wall thickness X13. In case the bond structure 20 comprises the adhesive layer 20-2 with the filler particles, the (lateral) thickness t 20-2 of the adhesive filler layer 20-2 can be in a range between 5 μm and 100 μm.

Thus, according to an embodiment, the bond structure 20 may comprises the diffusion layer 20-1 and the adhesive layer 20-2 in the bonding region 22 for providing the diffusion path 24 between the cavity 16 and the surrounding environment and for providing the adhesive bond between the base structure 12 and the lid element 14. According to an embodiment, the bond structure 20 may further comprise a further adhesive layer 20-3, where the diffusion layer 20-1 having a gas diffusive material is sandwiched between the adhesive layer 20-2 and the further adhesive layer 20-3. According to a further embodiment, the bond structure 20 comprises a stack of a plurality of alternating adhesive layers 20-2 and (sandwiched) gas diffusive layers 20-1.

According to an embodiment, at least one of the base structure 12 and the lid element 14 may further comprise a supporting structure 28, e.g. in form of a protrusion structure for mechanically stabilizing the diffusion layer 20-1.

According to an embodiment, the bond structure 20 may comprise an adhesive layer 20-2 in the bonding region 22 for providing the adhesive bond between the base structure 12 and the lid element 14. The adhesive layer (filler adhesive) 20-2 may comprise gas diffusive filler particles 25 for providing the diffusion path 24 through the bond structure 20. According to an embodiment, the adhesive layer 20-2 may comprise a PTFE material or a PTFE impregnated adhesive for providing the diffusion path 24 of the gas GCAV through the bond structure 20.

Based on the size and quantity (density) of the gas diffusive filler particles 25 in the adhesive layer 20-2 and based on the dimensions of the adhesive layer 20-2, the diffusion time constant TD can be set to a requested value. Thus, the more filler particles 25 in the adhesive layer 20-2 and the greater the dimension (e.g. the vertical cross-sectional area) of adhesive layer 20-2, the shorter is the (set) diffusion time constant TD.

According to an embodiment, the adhesive layer 20-2 may comprise a gas diffusion section 26 for providing the gas diffusion path 24 through the bond structure 20. According to an embodiment, the diffusion section 26 may be formed as at least one channel(s) 26 through the adhesive layer 20-2 and comprises a gas diffusive material.

According to a further embodiment, the diffusion section 26 in the adhesive layer 20-2 may comprise a gas diffusive filler material or gas diffusive filler particles embedded in the adhesive layer 20-2. Thus, a part (section) of the adhesive layer 20-2, which laterally extends through the bond structure 20, may comprise the gas diffusive filler material or gas diffusive filler particles and forms the diffusion path 24.

Further, a plurality of gas diffusion sections 26 of the adhesive layer 20-2, which laterally extend through the bond structure 20, may comprise the gas diffusive filler material or gas diffusive filler particles and may form the diffusion path 24.

In the following description of FIG. 2*a-d*, additions, differences or alternatives to the embodiments as shown in FIG. 1 are discussed in detail. Thus, the above description with respect to FIG. 1 can be applicable to the further embodiments as described below. Elements having the same structure and/or function are provided with the same reference numbers or name.

FIGS. 2*a-d* show further schematic cross-sectional views through further possible implementations of the package 100 for an optical radiation device 10 according to further embodiments. The further illustrations of the package 100 in FIGS. 2*a-d* indicate that the package 100 for an optical radiation device 10 can be implemented in different configurations (designs) of the respectively bonded base structure 12 and lid element 14 and to different positions of the bonding region 22 with the bond structure 20 between the base structure 12 and the lid element 14.

Figure 2A:
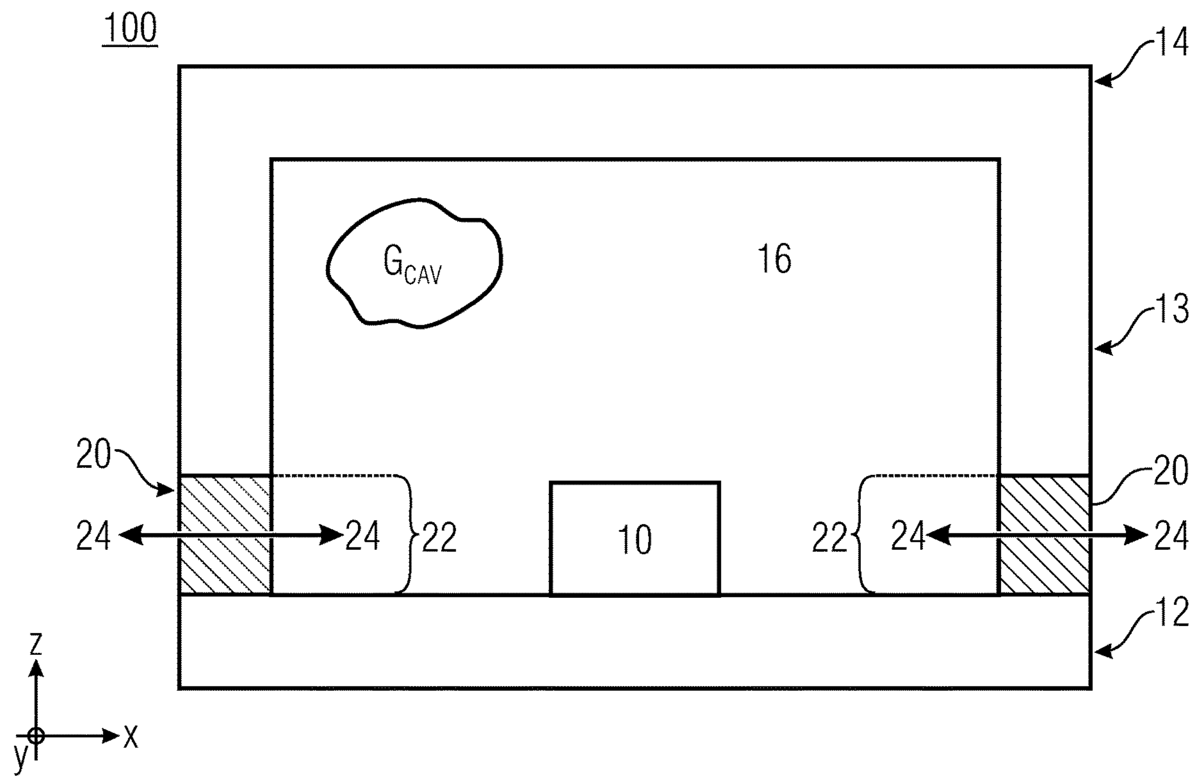
FIGS. 2*a-d* show schematic cross-sectional views of a package for an optical radiation device according to further embodiments.
Figure 2B:
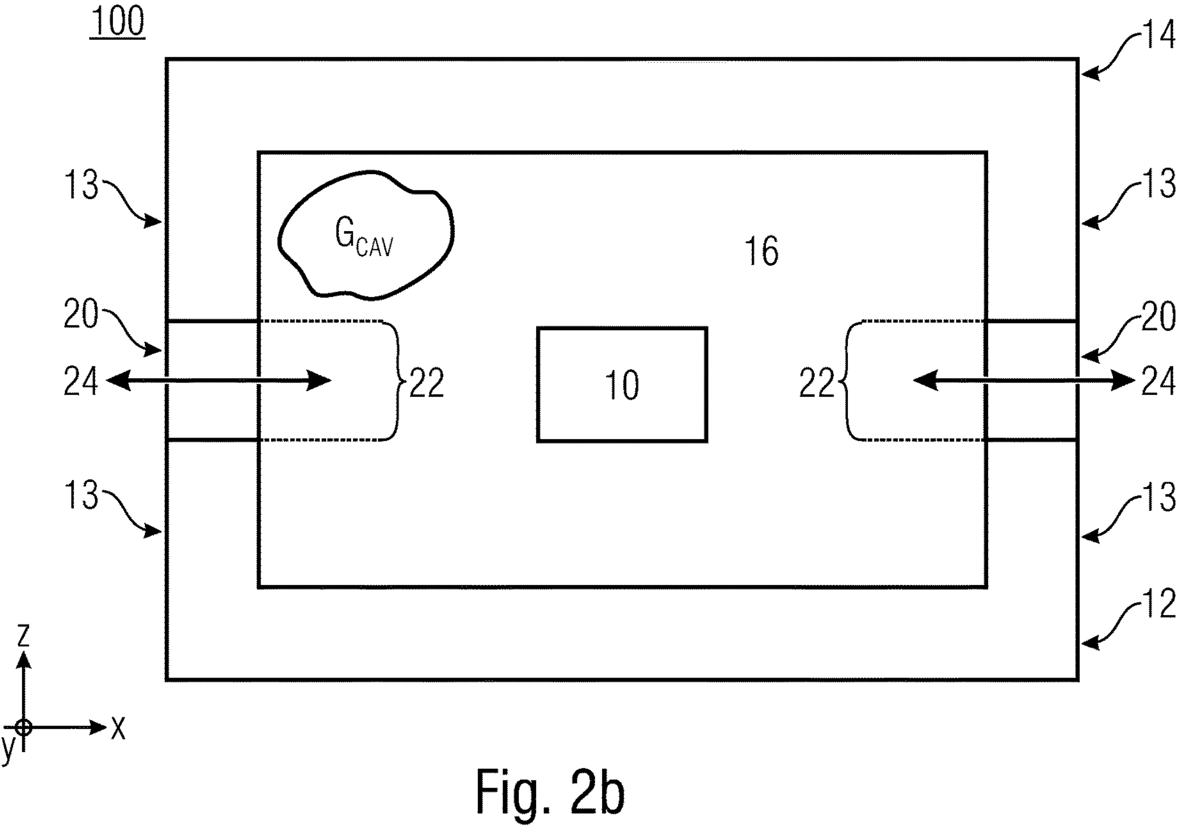

To be more specific, as shown in FIG. 1, the base structure (basis element) 12 may comprise the (vertically extending) side walls 13. As shown in FIG. 2*a*, the lid element 14 may comprise the (vertically extending) side walls 13. As shown in FIG. 2*b*, the base structure 12 and the lid element may each comprises a part of the (vertically extending) side walls 13. In each case, the bonding region 22 with the bond structure can be formed between the base structure 12 and the lid element 14. Thus, the lid element 14 can be placed (arranged) on top of the base structure 12.

Moreover, the package 100 can be implemented in configurations with further "intermediate elements" in the base structure 12, the lid element 14 and/or the side walls 13 as far as the intermediate elements are bonded to the base structure 12, the lid element 14 and/or the side walls 13 and provide for the package 100.

Moreover, the bond structure 20 may be formed (placed) at a desired height position of the side walls 13, e.g. at a top position as shown in FIG. 1, at a bottom position as shown in FIG. 2*a* or at an intermediate position as shown in FIG. 2*b*. Moreover, the bond structure 20 may be circumferentially arranged in the side walls 13 and parallel to the lateral (reference) plane, for example, for facilitating the manufacturing process.

Figure 2C:
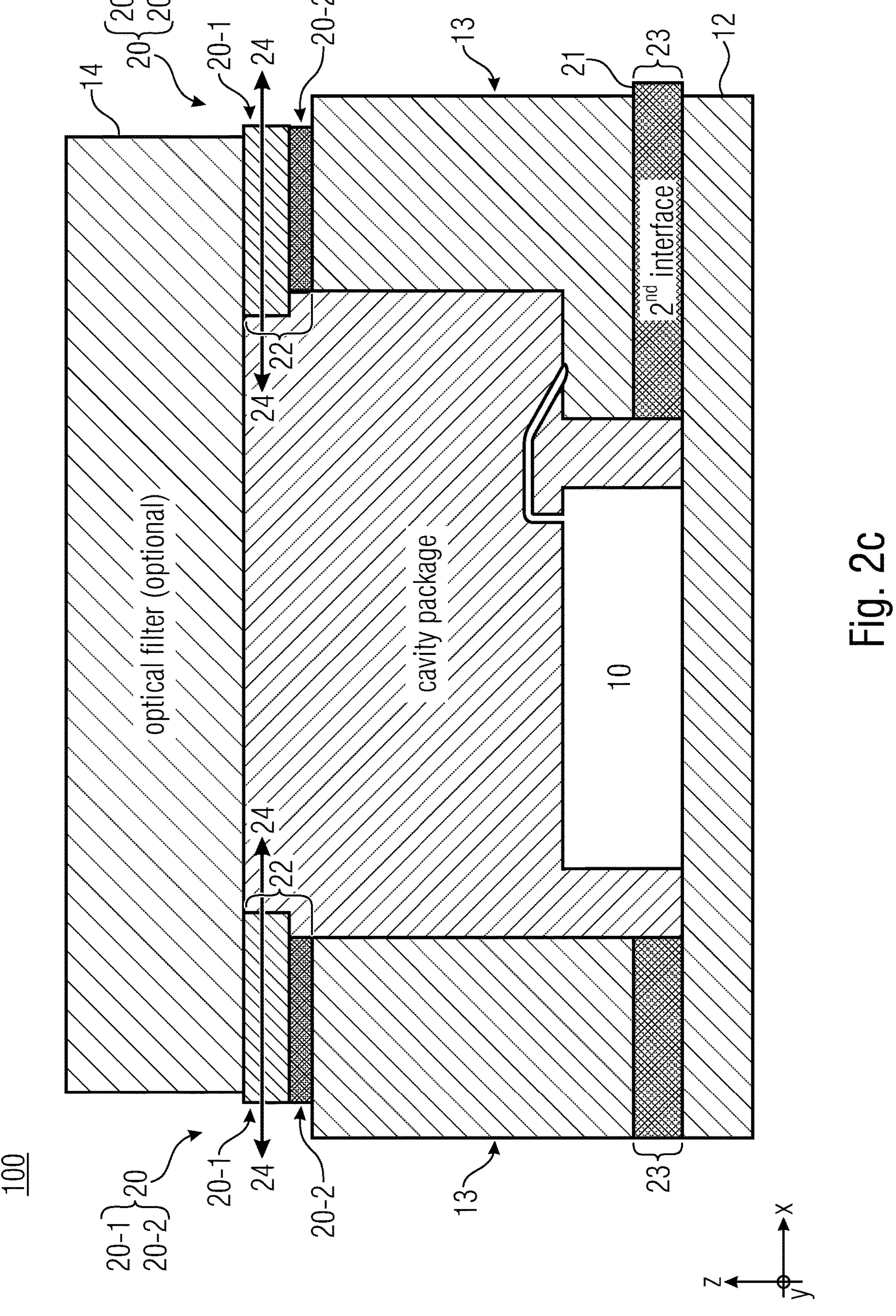

As shown in FIG. 2*c*, the side wall 13 of the package 100 can be arranged between and adhesively fixed (bonded) to the base structure (base element) 12 and the lid element (lid structure) 14. As shown in FIG. 2*c*, a further bond structure 21 may arranged in a further bond region 23 between the side wall 13 and the lid element 14, where the bond structure 20 is arranged in the bond region 22 between the side wall 13 and the base structure 20. The bond region 22 and the further bond region 23 can be vertically spaced from each other. Thus, the further bond region 23 may be formed (placed) at a bottom position of the side wall(s) 13 as shown in FIG. 2*c*. Alternatively, a least one of the bond region 20 or the further bond region 21 may be placed at an intermediate position of the side wall(s) 13.

Figure 2D:
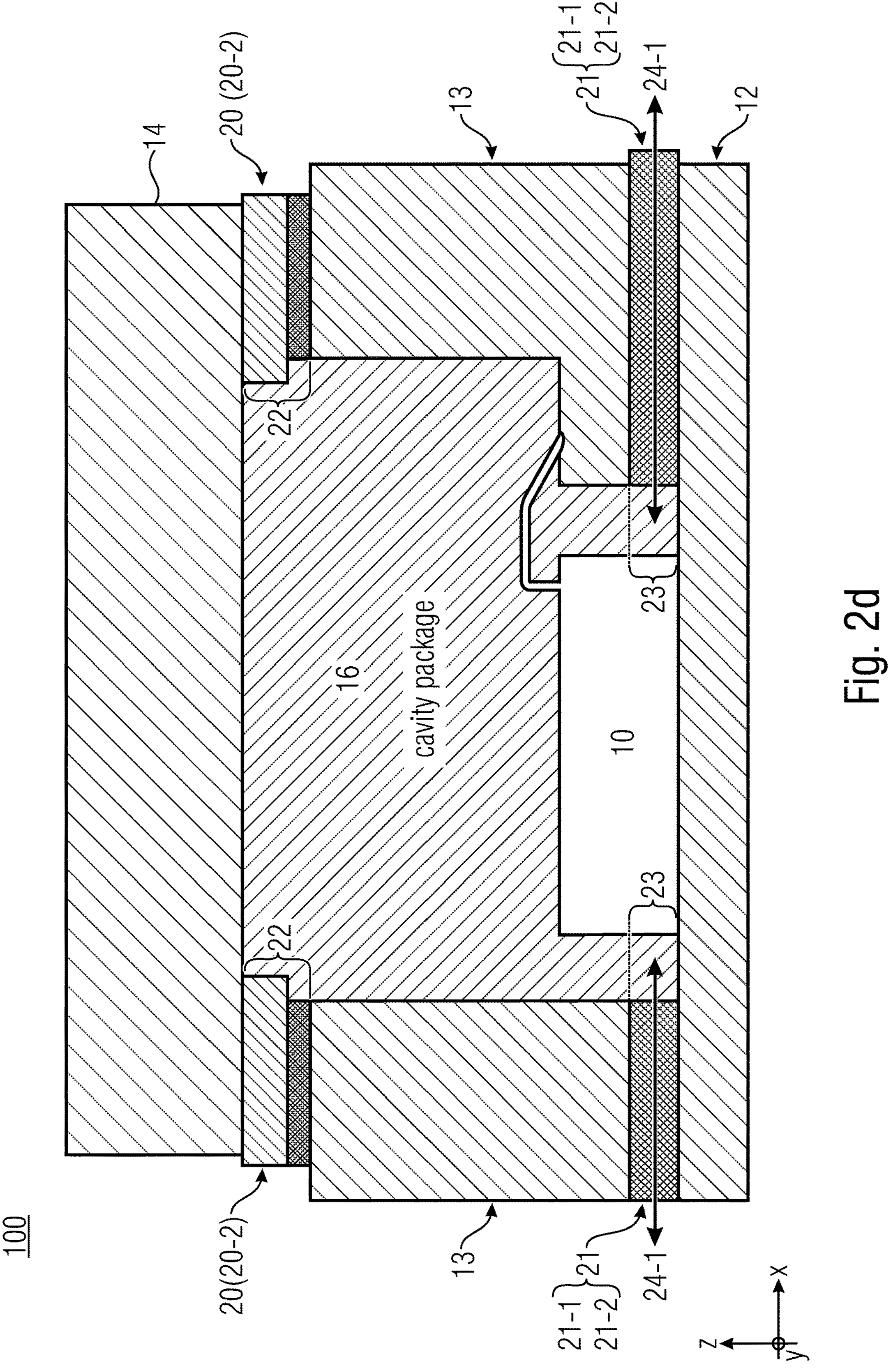

As shown in FIG. 2*d*, the further bond structure 21 may be arranged in a further bond region 23 between the side wall 13 and the base structure 12, where the bond structure 20 is arranged in the bond region 22 between the side wall structure 13 and the lid element 14. The bond region 22 and the further bond region 23 can be vertically spaced from each other. Thus, the further bond region 23 may be formed (placed) at a top position of the side wall(s) 13 as shown in FIG. 2*d*. Alternatively, a least one (or both) of the bond region 22 and the further bond region 23 may be placed at an intermediate position of the side wall(s) 13.

According to a further embodiment, the bond structure 20 and the further bond structure 21 may form together the diffusion paths 24, 24-1. Thus, the further bond structure 21 may comprise an adhesive layer 21-2 in the further bonding region 23 for providing the adhesive bond. According to a further embodiment, the adhesive layer 21-2 of the further bond structure may comprise gas diffusive filler particles 25 for providing a further diffusion path 24-1 through the bond structure 20. According to an embodiment, the adhesive layer 21-2 may comprise a PTFE material or a PTFE impregnated adhesive for providing the further diffusion path 24-1 of the target gas GTAR through the further bond structure 21.

According to a further embodiment, the further bond structure 21 may comprise a diffusion layer 21-1 having a gas diffusive material or gas diffusive structure for providing a further gas diffusion path 24-1 between the closed cavity 16 and the surrounding atmosphere. The further bond structure 21 may comprise the adhesive layer 21-2 in the further bonding region 23 for providing the adhesive bond.

Thus, the further bond structure 21 may comprise the same arrangement and function as the bond structure 20 for providing the further gas diffusion path 24-1.

Thus, the embodiments of FIGS. 1 and 2*a-d* describe a design of a package 100 that has a defined gas diffusion path 24 (24-1) to allow an out-diffusion of gases inside an optical radiation device 10, e.g. an emitter (PAS) 10-1 or a detector (NDIR) 10-2. A defined exchange with the ambient atmosphere, e.g. environmental air, can further and further dilute the gas GCAV inside the emitter/detector package 100.

Figure 7:
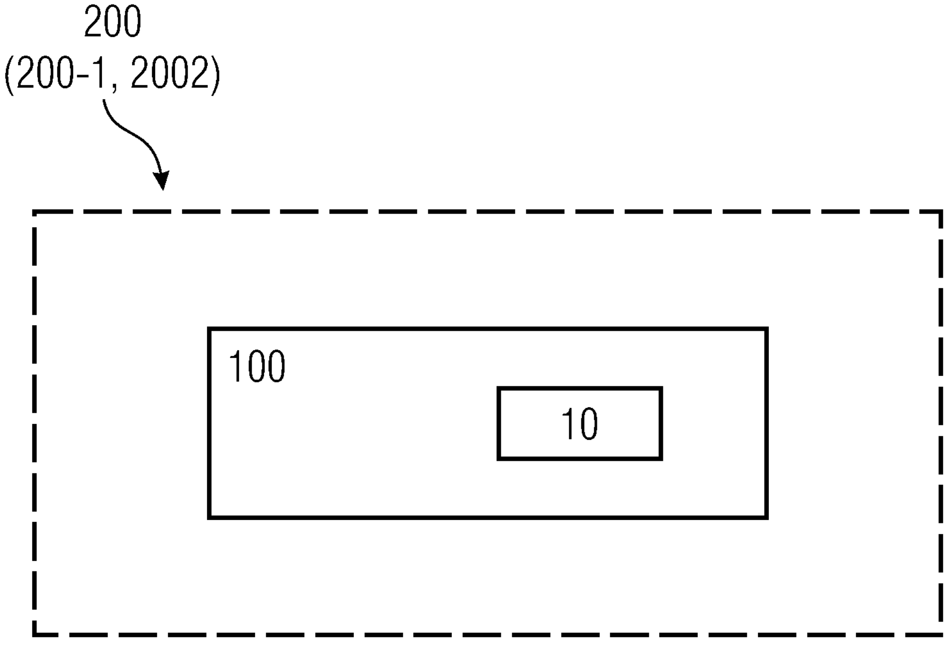
FIG. 7 shows a schematic block diagram of a fluid sensing device having the package for an optical radiation device according to a further embodiment.

The package 100 may be part of a gas sensor device (see FIGS. 7 and 8*a-b*). Once the gas GCAV is fully driven out and/or at the same level as (in an equilibrium with) the ambient gas concentration, the sensor device can be calibrated. A further increase of gas GCAV (e.g. due to operation) can be avoided due to the constantly given diffusivity of the package 100 through the bond structure 20 providing the diffusion path 24 between the cavity 16 and the surrounding atmosphere.

Depending on the material and geometry selection for the bond structure 20, short diffusion time constants (seconds/minutes) can be achieved by the interface layer stack which forms the bond structure 20. A gas GCAV can diffuse quickly inside the emitter/detector package 100 and can be calibrated out as the gas GCAV can be present in the sensor cell (sensor device) and in the emitter/detector package 100 in comparable or substantially equal concentrations.

According to the described embodiments, the package 100 uses a gas permeable structure or layer ("diffusion structure or layer" 21) in the interface (=bond structure=interface having a high gas diffusivity) 20 of the cavity package 100. The cavity 16 is enclosed by the base structure 12 and the lid element (lid structure) 14, where the lid element 14 may form or comprise an optical filter, for example. This diffusion layer (of the bond structure) 20 can be integrated in frontend or backend on the lid structure (e.g. a filter) 14 or base structure 12 of the cavity package 100 directly. To seal off the package 100, the bond structure 20 may comprise an adhesive layer (or layer stack). In some embodiments, filler particles can be directly integrated into the adhesive layer to modify its diffusion properties.

In the following description, further alternative embodiments are discussed in detail. Thus, the above description with respect to FIGS. 1 and 2*a-d* can be applicable to the further embodiments as described below. Elements having the same structure and/or function are provided with the same reference numbers or name.

FIG. 3*a-d* show schematic cross-sectional views through an acoustically tight package for an optical radiation device according to further embodiments together with an enlarged sectional view of the bond structure. As shown in FIGS. 3*a-d*, the bond structure 20 may comprise the diffusion layer 20-1 and the adhesive layer 20-2 in the bonding region 22 for providing the diffusion path 24 between the cavity 16 and the surrounding environment and for providing the adhesive bond between the base structure 12 and the lid element 14.

Figure 3A:
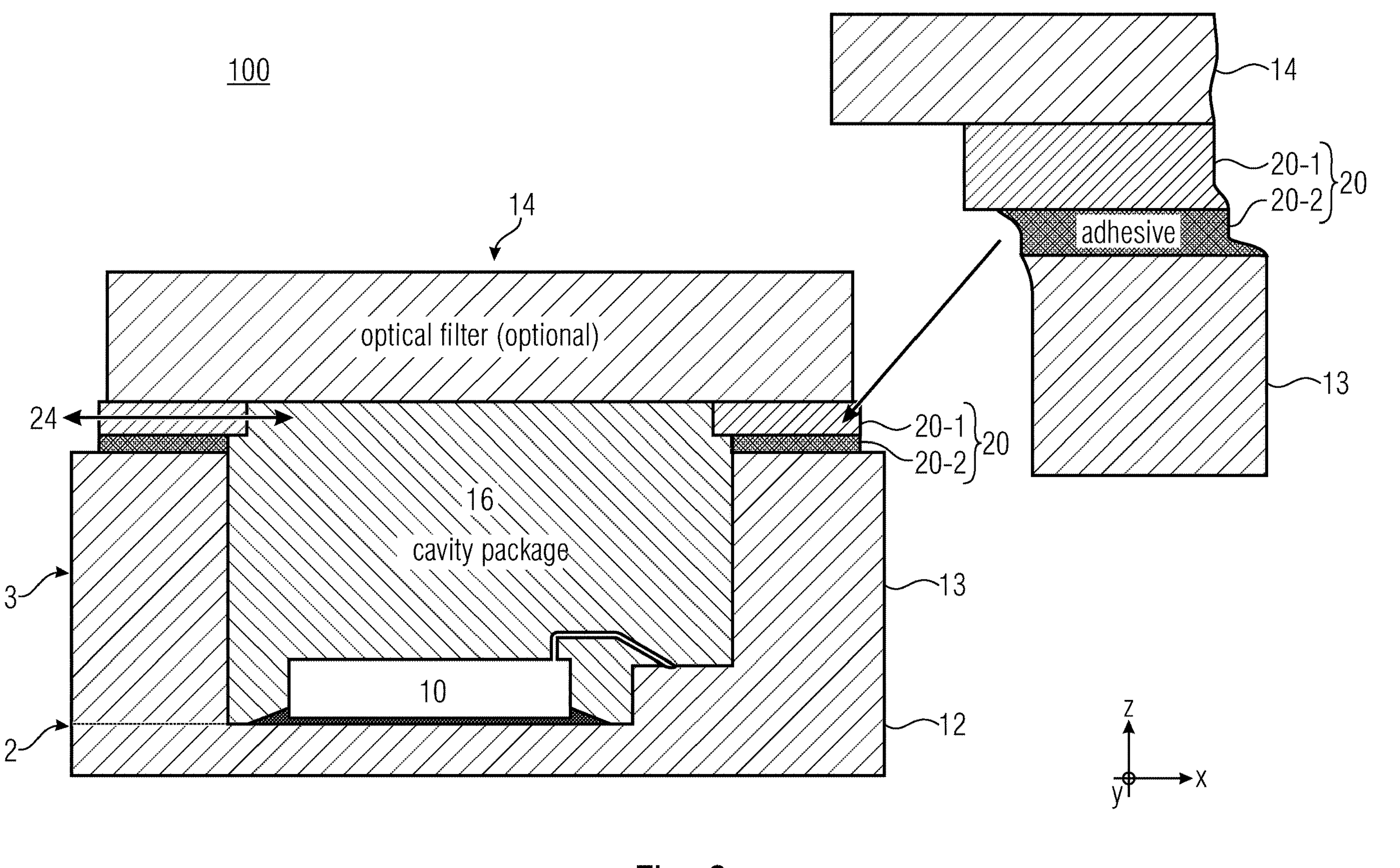
FIGS. 3*a-d* show schematic cross-sectional views of a package for an optical radiation device together with an enlarged cross-sectional view of the bond structure according to further embodiments.

As shown in FIG. 3*a*, the diffusion layer 20-1 is attached to the lid element 14, where the adhesive layer is attached to the wall element 13 of the base structure 12. Further, the opposing surfaces of the diffusion layer 20-1 and the adhesive layer 20-2 are attached to each other to form the bond structure 20.

Figure 3B:
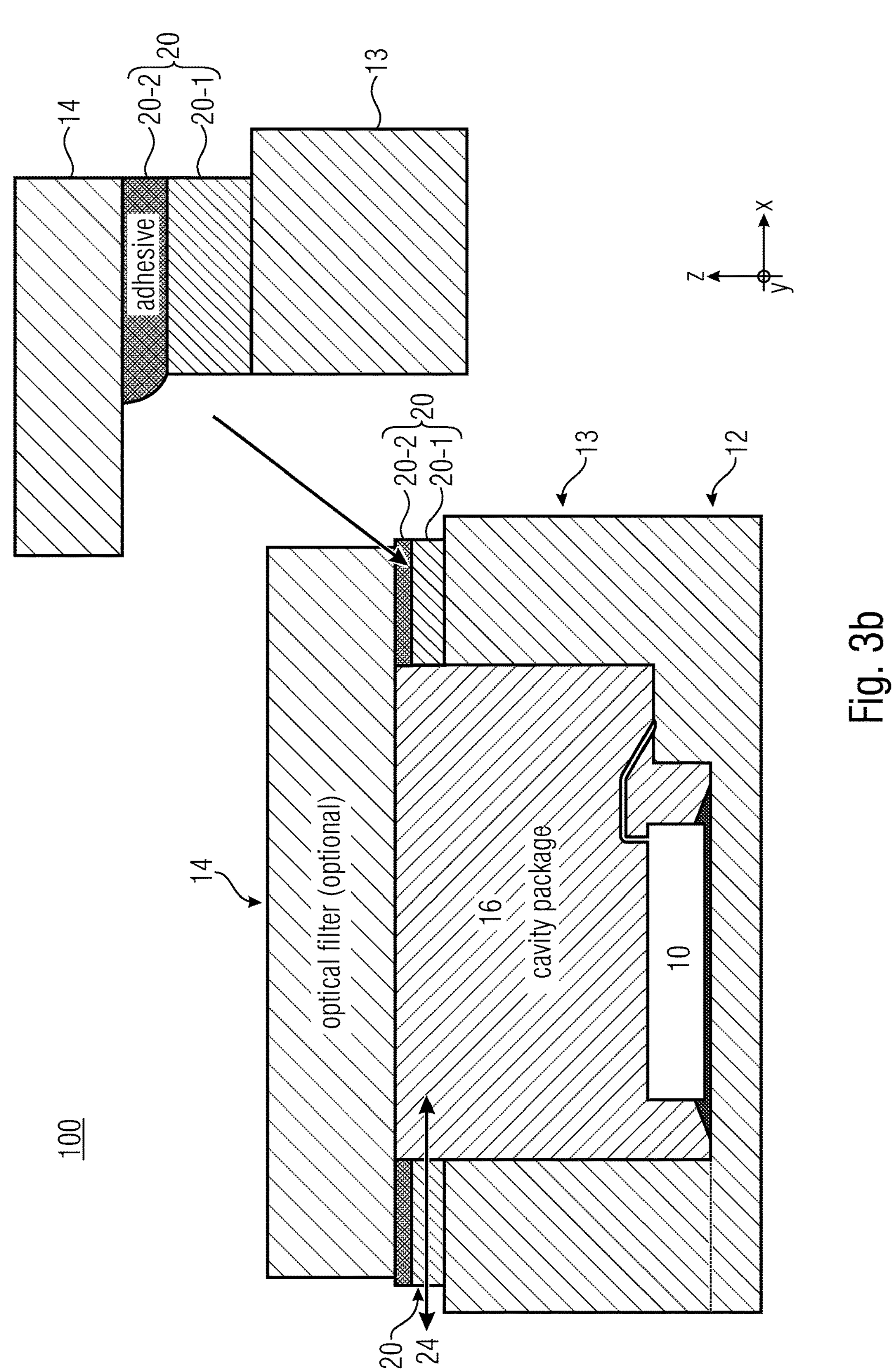

As shown in FIG. 3*b*, the diffusion layer 20-1 is attached to the wall element 13 of the base structure 12, where the adhesive layer is attached to the lid element 14. Further, the opposing surfaces of the adhesive layer 20-2 and of the diffusion layer 20-1 are attached to each other to form the bond structure 20.

Figure 3C:
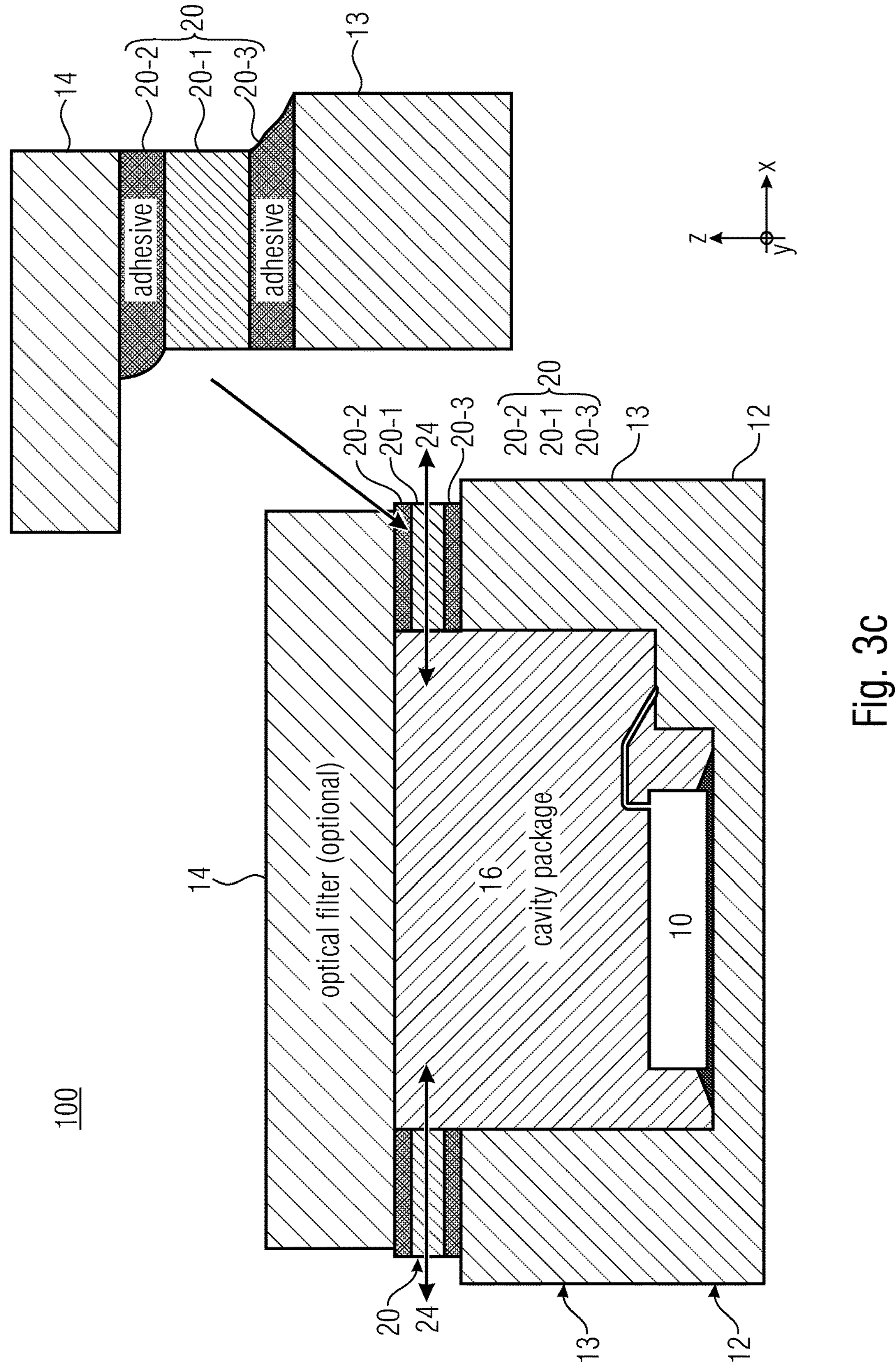

As shown in FIG. 3*c* the bond structure 20 may be formed as a triple stack with adhesive layers 20-2 and 20-3 of both sides of the diffusion layer 20-1. Thus, according to FIG. 3*c*, the bond structure 20 may further comprise the further adhesive layer 20-3, where the diffusion layer 20-1 having a gas diffusive material is sandwiched between the adhesive layer 20-2 and the further adhesive layer 20-3.

Figure 3D:
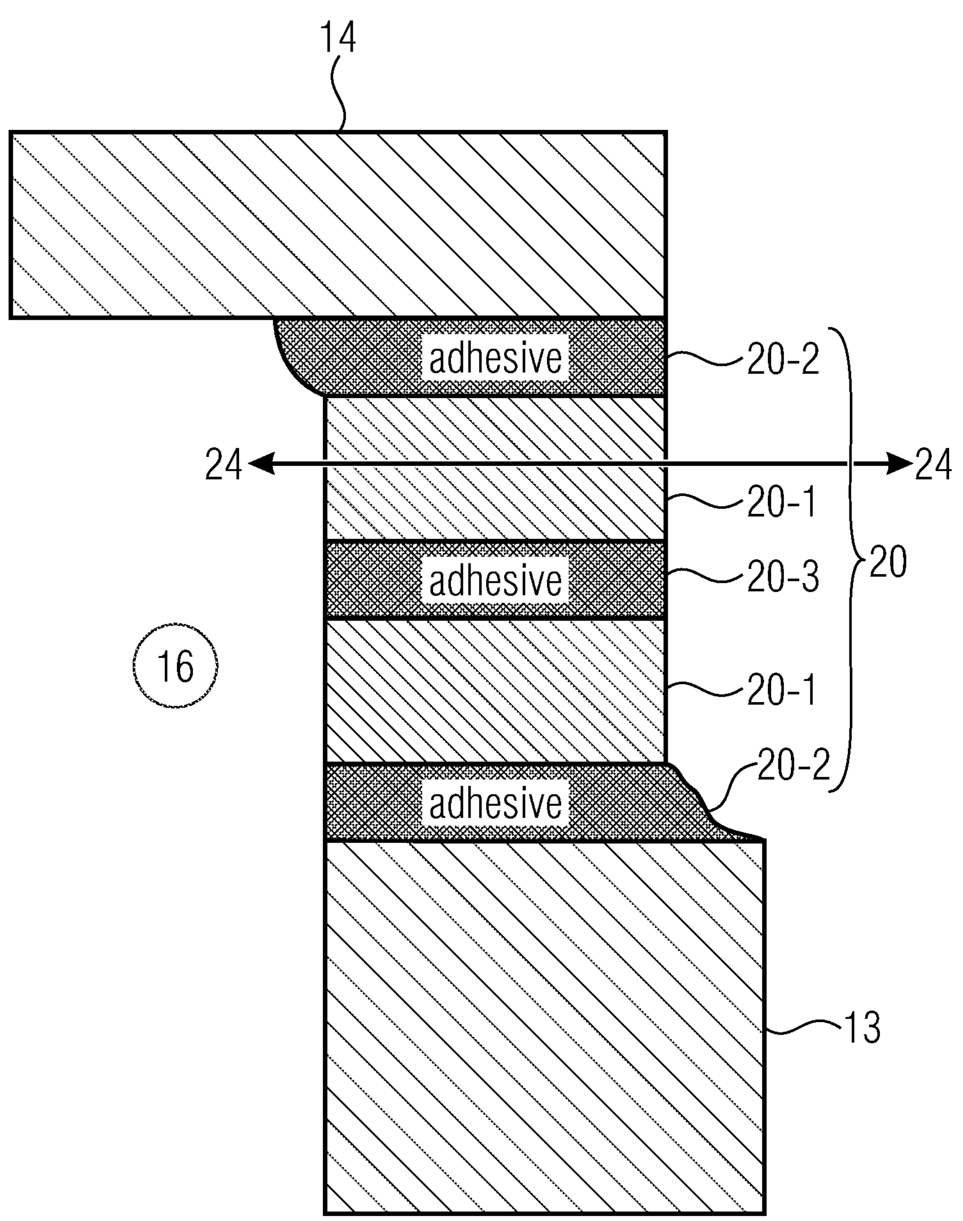

As shown in FIG. 3*d*, the bond structure 20 may comprise a stack of a plurality of alternating adhesive layers 20-2 and diffusion layers 20-1. As exemplarily shown in FIG. 3*d*, each diffusion layer 20-1 is sandwiched between two adhesive layers 20-2, 20-3, for example.

Figure 4:
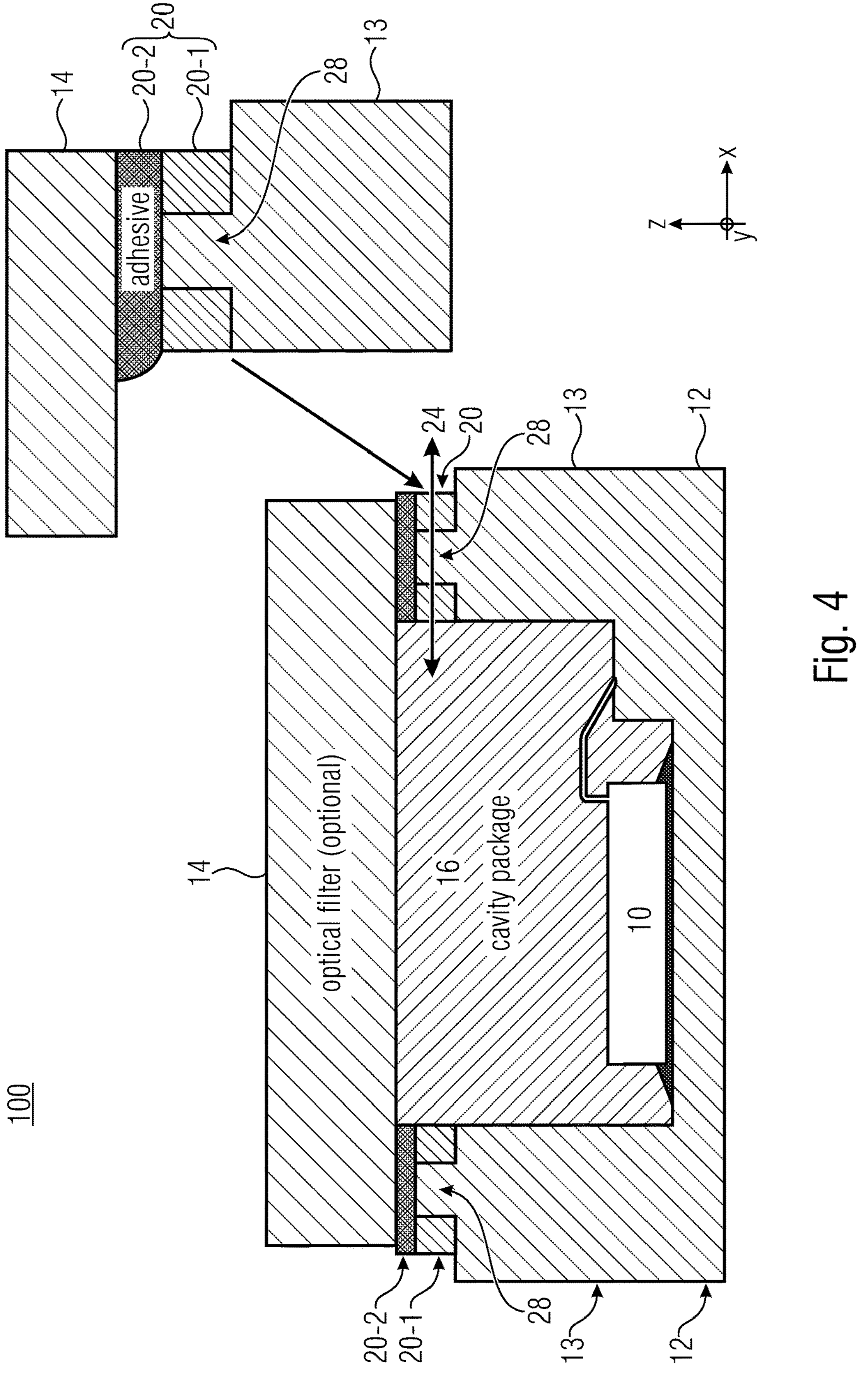
FIG. 4 shows a schematic cross-sectional view of the package for an optical radiation device together with an enlarged cross-sectional view of the bond structure according to a further embodiment.

FIG. 4 shows a schematic cross-sectional view through a package for an optical radiation device according to a further embodiment together with an enlarged sectional view of the bond structure. As shown in FIG. 4, at least one of the base structure 12 and the lid element 14 may further comprise a supporting structure 28, e.g., in the form of a protrusion structure or of bumps, for mechanically stabilizing the diffusion layer 20-1. The supporting or stabilization structure may be part of the base structure 12 or the lid element 14 or of both. In FIG. 4, the stabilization structure 28 is shown as part of the base structure 12 on top of the wall elements 13. The stabilization structures 28 are arranged to avoid a deflection of the lid element 14 (having an optical filter, for example) in case the diffusion layer 20-1 comprises a (relatively) soft and deformable material, e.g., a foam-like material.

To summarize, if the diffusion layer 20-1 comprises, for example, a soft foam-like material, the protrusion structures around the package frame (between the base structure 12 and the lid element 14) are arranged to stabilize the assembly by offering direct mechanical contact between the base structure 12 and the adhesive layer 20-2 which is attached to the lid element 14, for example, or between the base structure 12 and the lid element 14.

Alternatively, the protrusion structures may be formed at the lid element and may provide direct mechanical contact to the adhesive layer 20-2 which is attached to the top side of the wall elements 13 of the base structure 12, or directly to the wall elements 13 of the base structure 12.

Figure 5:
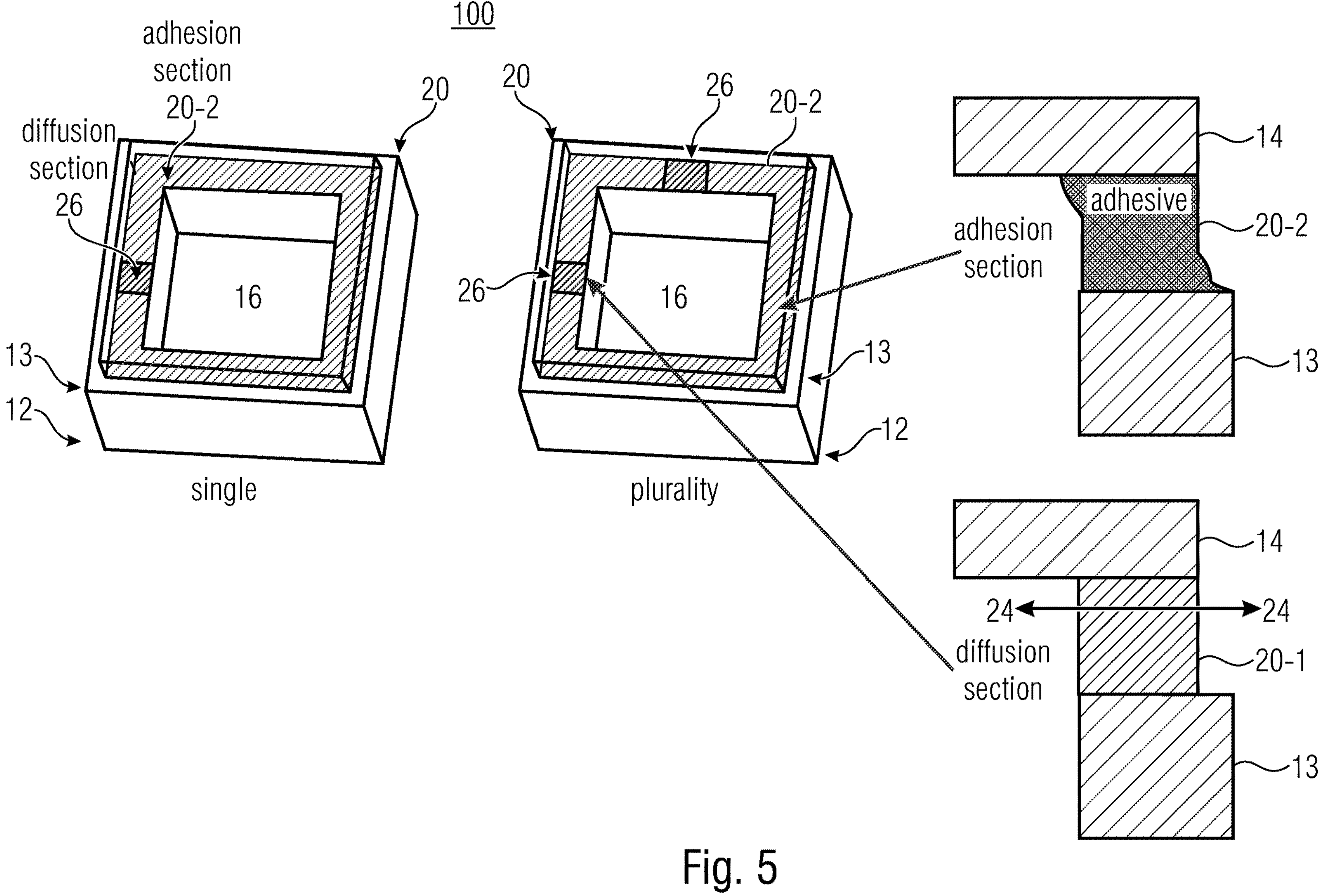
FIG. 5 shows a schematic 3D view of the package for an optical radiation device together with an enlarged cross-sectional view of the bond structure according to a further embodiment.

FIG. 5 shows a schematic 3D view of a package 100 for an optical radiation device 10 together with an enlarged cross-sectional view of the bond structure 20 according to a further embodiment.

As shown in FIG. 5, the adhesive layer 20-2 comprises a gas diffusion section 26 for providing the gas diffusion path 24 through the bond structure 20. According to the embodiment, the diffusion section 26 may be formed as at least one channel 26 or a plurality of channels 26 through the adhesive layer 20-2 and comprises a gas diffusive material. According to a further embodiment, the diffusion section 26 may comprise a gas diffusive filler material or gas diffusive filler particles embedded in the adhesive layer 20-2. Thus, the section 26 of the adhesive layer 20-2, which laterally extends through the bond structure 20, comprises the gas diffusive filler material or gas diffusive filler particles and forms the diffusion path 24. Further, a plurality of sections of the adhesive layer 20-2, which laterally extend through the bond structure 20, may comprise the gas diffusive filler material or gas diffusive filler particles and may form the diffusion path 24.

To summarize, the diffusion layer 20-1 may not fully surround the interface (bond structure) 20 but is partially formed as a section 26 of the bond structure 20. By introducing the diffusion section(s) 26 in the adhesion section (layer) 20-2, at least one or a plurality of diffusion channels 24 are formed through the adhesion layer(s) 20-2.

Figure 6:
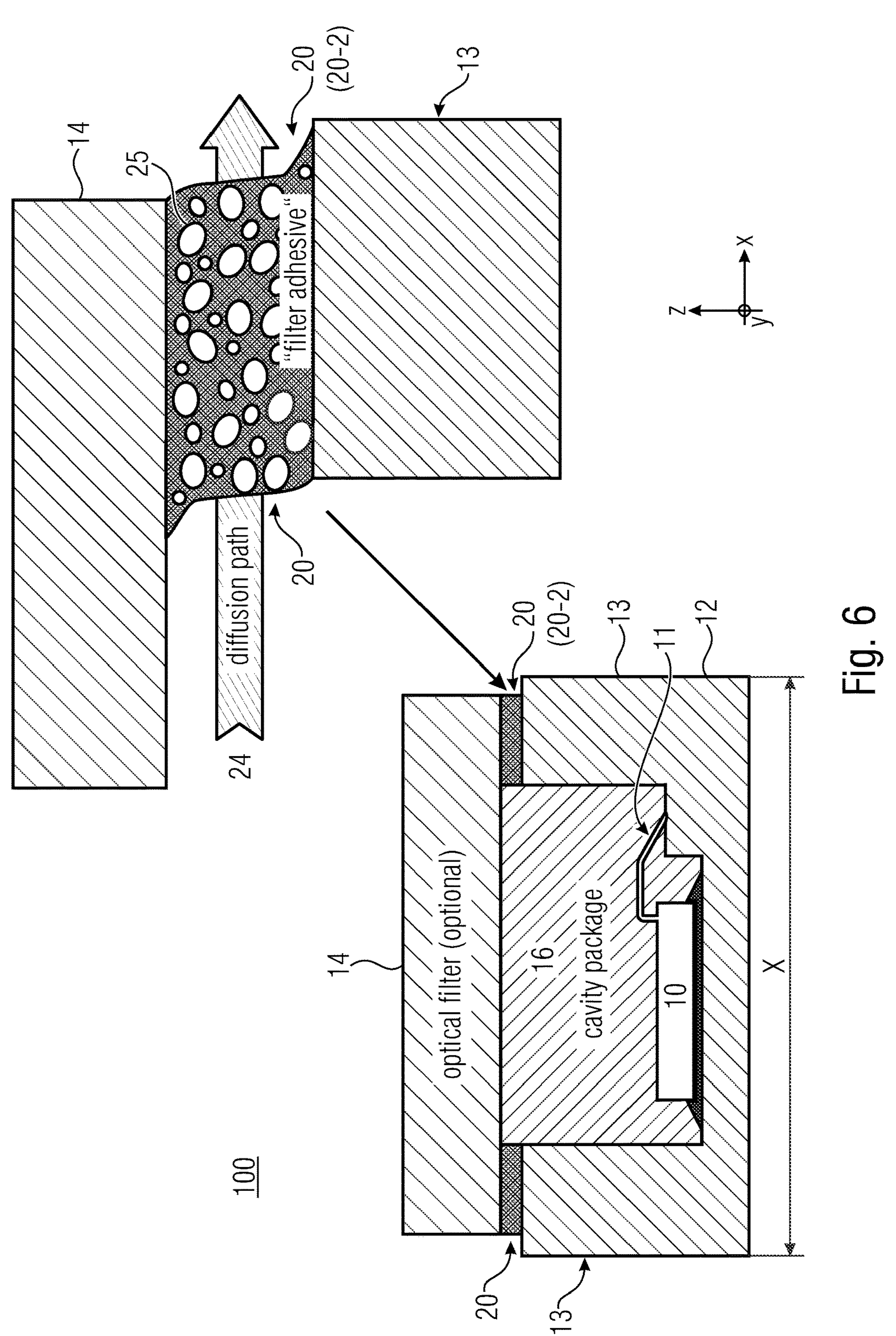
FIG. 6 shows a schematic cross-sectional view of the package for an optical radiation device together with an enlarged cross-sectional view of the bond structure according to a further embodiment.

FIG. 6 shows a schematic cross-sectional view through an acoustic type package for an optical radiation device 10 according to a further embodiment together with an enlarged view of the bond structure 20.

As exemplarily shown in FIG. 6, the adhesive layer (filler adhesive) 20-2 of the bond structure 20 may comprise gas diffusive filler particles 25 (filler particles which are diffusive for the gas GCAV) for providing the diffusion path 24 through the bond structure 20. According to an embodiment, the adhesive layer 20-2 may comprise a PTFE material or a PTFE impregnated adhesive for providing the diffusion path 24 of the gas GCAV through the bond structure 20. Based on the amount and quantity (or density) of the gas diffusive filler particles 25 in the adhesive layer 20-2, and based on the dimensions of the adhesive layer 20-2, the diffusion time constant TD can be set to a predefined value. Thus, the more filler particles in the adhesive layer 20-2 and the greater the dimension (e.g., the vertical cross sectional area) of the adhesive layer 20-2, the shorter the diffusion time constant TD can be.

To summarize, the adhesive layer 20-2 of the bond structure 20 may comprise filter particles 25 that reduce diffusion time, e.g., in a standard adhesive material. The filler particles 25, e.g., PTFE material, may allow a faster diffusion of the gas GCAV by having a shorter effective path length of the glue interface (bond structure) 20 to the outside (ambient atmosphere).

Thus, according to the above embodiments, the package 100 can have a highly gas permeable structure or layer based on the filler particles 25 in the bond structure (interface) 20 of the cavity package 100. As further indicated above, certain embodiments can be used in physical gas sensors, such as in photoacoustic spectroscopy (PAS) and non-dispersive infrared (NDIR) sensors.

In the following, some technical features of the package 100 for an optical radiation device 10 in form of an optical radiation source 10, e.g. as part of a PAS sensor, are summarized. The following features may also be applicable to the package 100 for an optical radiation device 10 in form of an optical radiation detector for a NDIR gas detector.

According to embodiments, a method to improve the emitter performance is to construct one element (the bond structure 20) as 'breathable', i.e. allow exchange of gas, while maintaining acoustic tightness. An adhesive 20-2 used to retain the lid element 14, which forms or comprises an IR filter, in place can be used where the adhesive may contain a PTFE or a similar gas exchanging/high permeability filler material. This structure allows the exchange of gas (parasitic gas GCAV) far more readily through the adhesive material.

The high gas permeability material suspended in the adhesive 20-2 provides a cavity 16, but still allows the transmission of gas both into and out of the emitter cavity 16. The gas exchanging material may not necessarily form a solid pathway between interior and exterior, such as when the adhesive already has some ability to allow gas exchange, to have a higher rate of gas permeability. An improved gas transmission may also occur along the interfaces between the adhesive and the more gas permeable filler.

The high gas permeability material in the adhesive 20-2 can allow equalization of (atmospheric) pressure between the IR emitter interior 16 and the gas measurement chamber (see FIG. 8*a*, for example) in which the IR emitter sits. The high gas permeability material can also allow any gas, e.g. CO2, generated from curing materials to escape. If the diffusion time of gas through the material (bond structure 20) is chosen to be much slower than that of the gas, e.g. CO2, entering the measurement chamber (see FIG. 8*a*, for example), the gas, e.g. CO2, measurement should not be affected.

As well as UV curing, the high gas permeability impregnated adhesive 20-2 can be cured by thermal means, since the adhesive material's breathability can allow pressure inside the ceramic cavity to equalize on cooling.

However, the gas exchange through the high gas permeability material 20-1 may not be fast enough during thermal curing (during the manufacturing process) to overcome internal air pressure changes, so that a slow ramp in heating may be applied. Thus, the adhesive 20-1 may remain in the joint between the base structure 12, e.g. a ceramic cavity, and the lid element 14, e.g. an IR filter, by internal air pressure, thereby preventing voids in the adhesive 20-1.

As exemplarily shown in FIGS. 1 to 6, the package may be formed as a ceramic cavity emitter package 100 and may comprise the optical radiation device 10 in form of an IR emitter (e.g. a MEMS heater) 10-1. Thus, the package 100 may be part of a PAS gas detector for detecting a target gas GTAR. According to an embodiment, the packaged emitter 10-1 is formed as a MEMS heater die on the base structure 12. The die is connected via wire-bonds 11 to a processing circuit (e.g. an ASIC). The light (radiation) emitted from the MEMS heater die 10-1 is transmitted to and through the transparent lid element 14. The led element 14 may comprise or form an IR filter (bandpass filter). The IR filter may be formed as a silicon IR filter so that filtered IR light emerges from the IR filter. The adhesive material 20-2 of the bond structure 20 retains the lid element (filter) 14 on the sidewalls of the (ceramic) cavity package 100.

According to the embodiments of FIGS. 1 to 6, the package 100 may comprise an acoustically tight gas diffusion path 24, e.g. with an acoustically tight bond structure 20. Thus, the package 100 may be arranged as an acoustically tight package 100. According to a further embodiment, the bond structure 20 may comprise a diffusion layer having a parasitic gas diffusive material or parasitic gas diffusive structure for providing an acoustically tight parasitic gas diffusion path 24 between the cavity 16 and the surrounding atmosphere 18.

FIG. 7 shows a schematic block diagram of a fluid sensing device 200 having the package 100 for an optical radiation device 10 according to a further embodiment. The fluid sensor 200 may comprise the package 100 for an optical radiation device 10.

According to an embodiment, the fluid sensor 200 may be formed as a PAS gas detector (fluid detector) 200-1, where the optical radiation device 10 is an IR emitter or a laser or LED 10-1 and part of the PAS gas detector 200-1 for detecting a target gas GTAR. The bond structure 20 of the package 100 is arranged to provide the diffusion path 24 for a gas GCAV through the bond structure 20. According to an embodiment, the bond structure 20 of the package 100 may be arranged to provide an acoustically tight diffusion path 24 for a parasitic gas GPAR through the bond structure 20.

According to a further embodiment, the fluid sensor 200 may be formed as an NDIR gas detector 200-2, where the optical radiation device 10 is an optical radiation detector 10-2, e.g., a thermopile detector, for detecting a target gas GTAR, where the bond structure 20 is arranged to provide the diffusion path 24 for a gas GCAV through the bond structure 20.

FIG. **8*a* shows a schematic block diagram of a fluid (gas or liquid) sensing device 200-1 in the form of a PAS gas sensor having the package 100 for an optical radiation device 10** according to a further embodiment.

As shown in FIG. **8*a*, the PAS gas sensor 200 comprises a light source 10-1 which is arranged in the package 100, e.g. an the acoustically tight package 100. The light source 10 may comprise an infrared emitter or a laser diode, for example. The light source 10 may be periodically chopped. The package 100 comprises an optical filter, which is, for example, part of the lid element 14, for a wavelength selection. The gas sensor device 200 further comprises a sample area (interaction area) 210 where the light or radiation R between the light source 10 and the detector 220 interacts with the environmental medium. The optical filter 14 is arranged to filter the wavelength related to a specific gas, e.g., a wavelength $\lambda$=4.26 μm for CO2. The detector 220 may be formed, for example, as a (capacitive or piezoelectric) MEMS microphone. In the interaction area 210, the molecules of the target gas GTAR, e.g. CO2 molecules, absorb the light R emitted from the light source 10 and filtered by the optical filter 14. The light absorption causes a periodic local change of temperature in the interaction area 210, which results in corresponding pressure changes in the interaction area 210. The periodic pressure changes are detected by the acoustic detector 220, e.g., a MEMS microphone, which is optimized for low frequency operation. The acoustic detector 220 may be read out by means of an ASIC 230, for example. Moreover, the closed interaction area may be accessible through a fluid port 240** for fluid (gas or liquid) diffusion.

Thus, embodiments may relate to a PTFE impregnated adhesive to secure of the lid element 14, e.g. an IR filter, to the base structure 12 defining a cavity 16, e.g. a ceramic cavity, on the PAS gas sensor 200-1, e.g. a PAS CO2 sensor.

FIG. **8*b* shows a schematic block diagram of a fluid sensing device in the form of an NDIR gas sensor 200-2 having the package 100 for an optical radiation device 10** according to a further embodiment.

According to FIG. **8*b*, the NDIR sensor device 200-2 comprises a radiation source 250, the package 100 for the detector 10-2, the package 100 comprises the lid element 14 having filter element for a wavelength selection and the sample area (interaction area) 210 which is accessible by means of a gas inlet/outlet 240. In the interaction area 210, the light R between the light source 250 and the detector 10** interacts with the environmental medium, e.g. the target gas GTAR.

Thus, the main components of the NDIR sensor 200-2 are an infrared IR source 250, the sample chamber or light tube 210, the light filter 14 and the infrared detector 10 in the package 100. The IR light R is directed through the sample chamber 210 towards the packaged detector 10. The target gas GTAR in the sample chamber 210 causes an absorption of a specific wavelength and the intensity change at this wavelength is measured by the detector 10 to determine the target gas concentration. The optical filter 14 in front of (upstream to) the detector is arranged to eliminate light except the wavelength band that the target gas molecules can absorb, such as an optical bandpass filter that passes the wavelength or wavelength band.

In the following, different technical implementations and technical effects of the package for an optical radiation device and the fluid sensor device 200 are summarized below. According to an embodiment, the bond structure 20 of the package 100 may be arranged to provide an acoustically tight diffusion path 24 for a parasitic gas GPAR through the bond structure 20.

Embodiments describe an improvement to existing cavity packages for gas sensing, which often contain a certain amount of the target gas interfering with the IR radiation as gas GCAV. According to the embodiments, a defined gas ventilation path 24 is provided inside the cavity package 100, where the cavity package 100 allows gas GCAV (parasitic gas) to penetrate at a specific rate. The cavity package 100 may be acoustically tight but also allows gas GCAV (parasitic gas) to penetrate at a specific rate. The ventilation path 24 can be formed as one or more separate (diffusion) layers or a diffusion material 20-1 embedded into existing adhesive layers 20-2 and/or 20-3.

The package 100 for an optical radiation device 100 may provide a drift stabilization of a gas sensing device 200, e.g., a PAS system 200-1 or a NDIR system 200-2 for gas sensing.

The package 100 according to the above embodiments can be inexpensive to manufacture, while the gas content may not be determined or controlled prior to calibration of the gas sensor device. The bond structure 20 can be inexpensively integrated in the package. Moreover, the package 100 provides a defined acoustical tightness for the gas sensor device 200, e.g., a PAS sensor 200-1 or an NDIR sensor 200-2, so that the package 100 can be inexpensively integrated into the measurement cell. Moreover, the package 100 can be formed to have high mechanical robustness as well as high resilience to temperature cycles.

Additional embodiments and aspects are described which may be used alone or in combination with the features and functionalities described herein.

According to an embodiment, a package for an optical radiation device comprises a base structure having arranged thereon the optical radiation device, an optically (IR, UV or visible radiation) transparent lid element bonded to the base structure defining a cavity between the base structure and the lid element, and a bond structure in a bonding region between the base structure and the lid element, where the bond structure is arranged to provide an adhesive bond between the base structure and the lid element, and where the bond structure comprises a diffusion layer having a gas diffusive material or gas diffusive structure for providing a gas diffusion path between the closed cavity and the surrounding atmosphere.

According to an embodiment, the optical radiation device is an optical radiation emitter or an optical radiation detector.

According to an embodiment, the package is acoustically tight and comprises an acoustically tight gas diffusion path.

According to an embodiment, the bond structure may comprise a diffusion layer having a parasitic gas diffusive material or parasitic gas diffusive structure for providing an acoustically tight parasitic gas diffusion path between the cavity and the surrounding atmosphere.

According to an embodiment, the optical radiation device is an IR emitter and part of a PAS gas detector for detecting a target gas, where the bond structure is arranged to provide an acoustically tight diffusion path for a gas through the bond structure.

According to an embodiment, the optical radiation device is an optical radiation detector and part of a NDIR gas detector for detecting a target gas, where the bond structure is arranged to provide the diffusion path for a gas through the bond structure.

According to an embodiment, the bond structure is arranged to have a gas permeability for providing a gas exchange through the diffusion path between the cavity and the surrounding environment with a diffusion time constant which is below 600, 300, 100 or 10 seconds.

According to an embodiment, the bond structure comprises an adhesive layer in the bonding region for providing the adhesive bond between the base structure and the lid element.

According to an embodiment, the adhesive layer comprises gas diffusive filler particles for providing the diffusion path through the bond structure.

According to an embodiment, the adhesive layer comprises a PTFE material or a PTFE impregnated adhesive for providing the diffusion path of the target gas through the bond structure.

According to an embodiment, the adhesive layer comprises a gas diffusion section for providing the gas diffusion path through the bond structure.

According to an embodiment, the diffusion section is formed as at least one channel through the adhesive layer and comprises a gas diffusive material.

According to an embodiment, the diffusion section comprises a gas diffusive filler material or gas diffusive filler particles embedded in the adhesive layer.

According to an embodiment, the bond structure further comprises a further adhesive layer, where the diffusion layer having a gas diffusive material is sandwiched between the adhesive layer and the further adhesive layer.

According to an embodiment, at least one of the base structure and the lid element, further comprises a supporting structure, e.g. in form of a protrusion structure, for mechanically stabilizing the diffusion layer.

According to an embodiment, the bond structure comprises a stack of a plurality of alternating adhesive and parasitic gas diffusive layers.

According to an embodiment, the package further comprises an intermediate wall structure between the base structure and the lid element, where a further bond structure is arranged in a further bond region between the intermediate wall structure and the lid element, and where the bond structure is arranged in the bond region between the intermediate wall structure and the base structure, or where a further bond structure is arranged in a further bond region between the intermediate wall structure and the base structure, and where the bond structure is arranged in the bond region between the intermediate wall structure and the lid element.

According to an embodiment, a fluid sensor comprises the package for an optical radiation device.

According to an embodiment, the fluid sensor is a PAS gas detector, where the optical radiation device is an IR emitter and part of the PAS gas detector for detecting a target gas, and where the bond structure is arranged to provide an acoustically tight diffusion path for a gas through the bond structure.

According to an embodiment, the fluid senor is a NDIR gas detector, where the optical radiation device is an optical radiation detector and part of the NDIR gas detector for detecting a target gas, where the bond structure is arranged to provide the diffusion path for a gas through the bond structure.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

In the foregoing description, various features are grouped together in examples for the purpose of descriptive clarity. However, various features can be used in different combinations with each other within the scope of the present description.

What is claimed is:

1. A package comprising:

a base structure supporting an optical radiation device;

a lid element bonded to the base structure and defining a cavity between the base structure and the lid element, wherein the lid element, as a whole, is optically transparent for infrared, (IR), ultraviolet (UV) or visible radiation; and a bond structure between the base structure and the lid element, wherein the bond structure adhesively bonds the base structure and the lid element together, and wherein the bond structure comprises a diffusion layer between the cavity and a surrounding atmosphere.

2. The package of claim 1, wherein the optical radiation device is an optical radiation emitter or an optical radiation detector.

3. The package of claim 1, wherein the package is acoustically tight and the diffusion layer further comprises a gas diffusion path that is acoustically tight.

4. The package claim 3, further comprising a fluid diffusive material or a fluid diffusive structure in the diffusion layer for providing a fluid diffusion path.

5. The package of claim 3, wherein the optical radiation device is an infrared (IR) emitter that is included in a PAS gas detector for detecting a target gas, and wherein the gas diffusion path passes through the bond structure.

6. The package of claim 3, wherein the optical radiation device is an optical radiation detector included in a NDIR gas detector for detecting a target gas, wherein the gas diffusion path provides diffusion for a cavity gas located in the cavity.

7. The package of claim 3, wherein the gas diffusion path is associated with a gas permeability between the cavity and a surrounding environment having a diffusion time constant less than 600 seconds between the cavity and the surrounding environment.

8. The package of claim 3, further comprising an adhesive layer in the bond structure.

9. The package of claim 8, further comprising filler particles in the adhesive layer that are gas diffusive and contribute to the gas diffusion path.

10. The package of claim 8, further comprising a PTFE material or a PTFE impregnated adhesive in the adhesive layer.

11. The package of claim 8, further comprising a gas diffusion section in the adhesive layer.

12. The package of claim 11, further comprising at least one channel for the gas diffusion path in the gas diffusion section.

13. The package of claim 11, further comprising a filler material or filler particles in the gas diffusion section.

14. The package of claim 8, further comprising a further adhesive layer that is adjacent to the diffusion layer that is further adjacent to the adhesive layer.

15. The package of claim 1, further comprising a supporting structure for mechanically stabilizing the diffusion layer located at at least one of the base structure or the lid element.

16. A photoacoustic spectroscopy (PAS) fluid detector comprising:

a base structure supporting an optical radiation device;

a lid element bonded to the base structure and defining a cavity between the base structure and the lid element, wherein the lid element, as a whole, is being optically transparent for infrared (IR) radiation; and a bond structure between the base structure and the lid element, wherein the bond structure adhesively bonds the base structure and the lid element together, and wherein the bond structure comprises a diffusion layer between the cavity and a surrounding atmosphere.

17. The PAS fluid detector of claim 16, wherein the cavity is acoustically tight and the diffusion layer further comprises a fluid diffusion path that is acoustically tight.

18. The PAS fluid detector of claim 17, further comprising a fluid diffusive material or a fluid diffusive structure in the diffusion layer for providing the fluid diffusion path.

19. A nondispersive infrared (NDIR) fluid detector comprising:

a base structure supporting an optical radiation device;

a lid element bonded to the base structure and defining a cavity between the base structure and the lid element, wherein the lid element, as a whole, is optically transparent for infrared (IR) radiation; and a bond structure between the base structure and the lid element, wherein the bond structure adhesively bonds the base structure and the lid element together, and wherein the bond structure comprises a diffusion layer between the cavity and a surrounding atmosphere.

20. The NDIR fluid detector of claim 19, wherein the cavity is acoustically tight and the diffusion layer further comprises a fluid diffusion path that is acoustically tight, and further comprising a fluid diffusive material or a fluid diffusive structure in the diffusion layer for providing the fluid diffusion path.

* * * * *